United States Patent Office 3,741,736
Patented June 26, 1973

3,741,736
PROCESS AND DEVICE FOR THE PRODUCTION OF ACETYLENE-ETHYLENE MIXTURES
Henning Bockhorn, Darmstadt, Fritz Fetting, Darmstadt-Eberstadt, and Hans-Adolf Herbertz, Neu-Isenburg, Germany, and Norberto Galdo, La Paz, Bolivia, assignors to Deutsche Gold- und Silber-Scheideanstalt vormals Roessler, Frankfurt am Main, Germany
Filed Oct. 26, 1971, Ser. No. 192,605
Claims priority, application Germany, Oct. 27, 1970,
P 20 52 543.3
Int. Cl. C10j 19/00; C07c 11/24
U.S. Cl. 48—113                                    10 Claims

ABSTRACT OF THE DISCLOSURE

A process for the production of acetylene-ethylene mixtures by mixing at least one light saturated hydrocarbon with oxygen or an oxygen containing gas to form a first mixture, and reacting the first mixture in a flame reaction wherein the improvement comprises reacting the hydrocarbon with the oxygen or oxygen containing gas in a diffusion flame to form a second mixture containing acetylene and ethylene. A device for carrying out the process is provided.

---

This invention relates to a process for the non-catalytic synthesis of unsaturated hydrocarbons from light saturated hydrocarbons in diffusion flames, as well as a device to carry out this process.

Unsaturated hydrocarbons, especially acetylene and ethylene, are endothermic compounds which are metastable at room temperature vis-a-vis the elements. The enthalpies of formation for the formation reactions of these compounds from saturated hydrocarbons will become negative only above temperatures of 1000° K. Therefore, when synthesizing these compounds, especially acetylene and ethylene, from saturated hydrocarbons it is not only necessary to provide the energy necessary for the endothermic reaction, but the reactions must also be carried out at temperatures above 1000° K. These conditions can be realized for example in flames in which very much energy can be liberated in a small space at high temperature.

It has been known in the case of flame reactions that an exothermic combustion reaction is coupled with the endothermic synthesis. Two processing principles can be differentiated: in the case of one-step processes, both reactions run in the form of an incomplete combustion of the hydrocarbon used, one beside the other (German Federal Patents 1,174,762 and 1,159,409 and H. Sachsse, Chemie-Ing.-Techn. 26, 245, 1945). In the case of two-step processes, the products used for the endothermic synthesis reaction are mixed with the hot combustion gases of one or more energy supplying flames, and are made to react in that way (German Federal Patent 1,040,533 and German published application 1,237,095). The reaction products, acetylene and ethylene, are unstable with regard to the elements in the case of the prior art reaction temperatures, so that the entire reaction mass after a short dwell time in the hot reaction zone must be quenched. As a result of that, acetylene and ethylene are converted into a thermodynamically metastable state. The quenching is accomplished by a heat exchanger or by direct injection of the cooling medium, e.g. water.

The known one-step processes are carried out with a premixed reaction mixture. At the same time, fuels and oxidation agents are preheated, and are mixed in a diffuser and subsequently flow through a burner block on which the flames develop. In order to prevent a flashback of the flames into the mixture, these reactors can be operated at a fixed flame velocity of the mixtures only under certain flow conditions. Therefore, they are not very flexible, since the flame velocity of the mixture depend on their composition, that is to say on the ratio of the number of carbon atoms to the number of oxygen atoms (C/O ratio). In turn, the reaction temperature, and thus the ratio of the unsaturated hydrocarbons in relation to one another (e.g. ratio of acetylene to ethylene), is determined by the C/O ratio.

The known two-step processes do not have these disadvantages, since in this case the reaction temperature and the ratio of the unsaturated hydrocarbons in the reaction products can be adjusted by the ratio of the volume of the streams of the heat carrier to the mixture used. They can however be carried out only in reactors with a complex structure.

Accordingly, this invention provides an improved process for the production of acetylene-ethylene mixtures by mixing at least one light saturated hydrocarbon with oxygen or an oxygen containing gas to form a first mixture, and reacting the first mixture in a flame reaction wherein the improvement comprises reacting the hydrocarbon with the oxygen or oxygen containing gas in a diffusion flame to form a second mixture containing the acetylene and ethylene.

This invention also provides a device for preparing acetylene-ethylene mixtures by reacting at least one light saturated hydrocarbon with oxygen or an oxygen containing gas in a diffusion flame, said device comprising walls defining a combustion chamber, at least one nozzle in a wall of the combustion chamber for the passage of the light hydrocarbon, and a flow channel surrounding said nozzle for the passage of oxygen or oxygen containing gas.

This invention also provides for the use of a diffusion flame as a chemical reactor in the preparation of acetylene-ethylene mixtures comprising mixing at least one light saturated hydrocarbon with oxygen or an oxygen containing gas to form a first mixture, and reacting the first mixture in a flame reaction using the diffusion flame.

This invention will be more clearly understood from the appended figures in which.

Figure 1A:
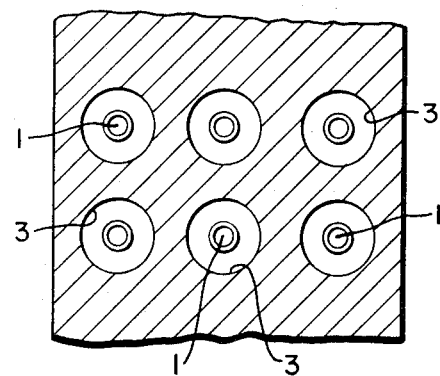
FIG. 1a is a cross-sectional view of a preferred device of this invention.

This invention is applicable generally to light saturated hydrocarbons as reactants. Hydrocarbons having about 1–8 carbon atoms are preferred. Propane is particularly preferred. A diffusion flame is a flame in which a fuel such as the light hydocarbons, and oxidant, such as oxygen or an oxygen containing gas, are fed separately into the reaction zone of the flame. The diffusion flame can be contrasted with a flame in which the fuel and oxidant are mixed before being fed into the flame. In prior art processes in which a flame reactor was employed, only the latter type of flame is known to have been used. According to this invention, a diffusion flame is used as a special kind of chemical reactor in the preparation of acetylene and ethylene mixtures. The reaction can be carried out by using the device of this invention.

The disadvantages occurring in the previously mentioned processes will be avoided by carrying out the synthesis in diffusion flames. According to this invention, the hydrocarbon and oxygen, or the oxygen containing gas mixture, are introduced into a combustion chamber separately, and optionally in a preheated state. The two components are mixed in the combustion chamber by concentric jets. The rate of the combustion reaction is determined by the speed of mixing of the hydrocarbons with the oxygen in the combustion chamber. Since the hydrocarbon and the oxygen aer mixed only in the combustion chamber, local inhomogeneities with regard to temperature and concentration of the individual components in the diffusion flames can occur. It will be recognized that gas at the outlet of each jet possesses a momentum as defined by the gas flow rate, mass of the fluid and cross-sectional area of the outlet of the jet. The inhomogeneities are readily controlled by controlling the momentum ratios of the hydrocarbon jet and the oxygen jet. Thus, the effective C/O ratio in the reaction mixture prevailing in the areas of mixing can be adapted to the C/O ratio calculated from the volume of the streams of hydrocarbon and oxygen, assuming complete mixing. If, for example, the hydrocarbon jet as compared to the oxygen jet has a very high momentum, then the oxygen will be sucked in very quickly by the hydrocarbon jet and mixed intensively with the latter. This leads to relatively slight deviations of the effective C/O ratio from C/O ratios calculated from the volume of the streams assuming complete mixing. This results in hot flames with a high acetylene content in the gas product.

If the momentum of each jet is about the same, then the mixing is less intensive. Along the axis of the hydrocarbon jet, there are areas where the components are not mixed at all. At the areas of contact of the two jets, flames develop, the heat of which is transferred to the areas where no mixing occurs. As a result, the gas products at relatively low or medium temperature will contain a higher portion of ethylene.

Therefore, the synthesis of acetylene and ethylene is carried out according to the process of the invention in a simple reaction with the aid of diffusion flames, so that a flash-back of the flames into preceding installations will be impossible. At the same time, the process shows great flexibility regarding the relative amounts of ethylene and acetylene in the product by the choice of the momentum ratios of fuel and oxidant at the same gross composition of the reaction mixture.

In a preferred embodiment of this invention, the momentum of the oxygen jet and the momentum of the hydrocarbon jet are such that the flow of each gas is in the turbulent region. It is particularly preferred that the ratio of the momentum of the gas from the hydrocarbon jet to the momentum of the gas from the oxygen or oxygen containing gas jet is about 1–200. It is also preferred that the C/O ratio (i.e. number of carbon atoms/number of oxygen atoms) in the reaction mixture is about 0.8–1.6.

The enthalpies of formation of acetylene and ethylene, reaction temperatures and corresponding pressures will be apparent to those skilled in the art of chemical thermodynamics. See, for example, G. N. Lewis and M. Randall, Thermodynamics, New York (1961), K. Denbigh, The Principles of Chemical Equilibrium, University Press Cambridge (1965), and J. H. Perry, Chemical Engineers Handbook. If desired, the ethylene and acetylene can be separated by conventional techniques.

Figure 1B:
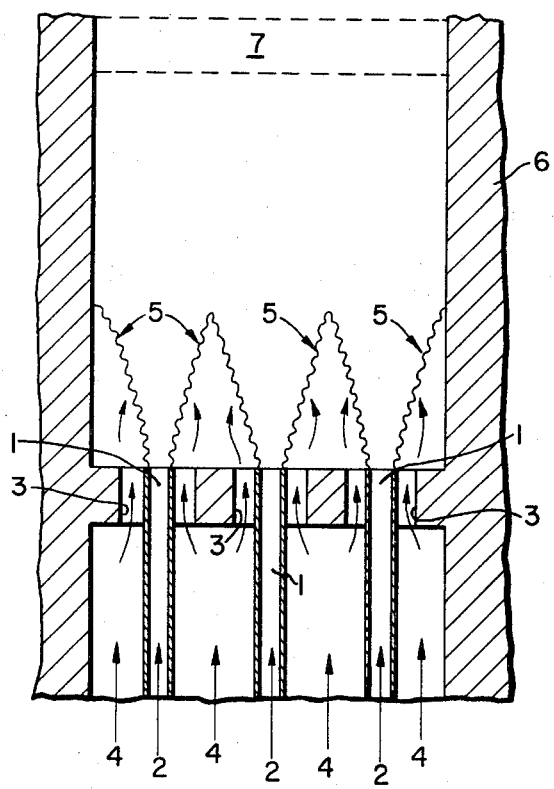
FIG. 1b is a longitudinal view of a section of a preferred device of this invention.

The process of this invention can be carried out advantageously in a device depicted in FIGS. 1a and 1b. Gaseous hydrocarbon 2 is conducted through a number of nozzles 1, shown in a round shape in the figures. Every nozzle 1 (one or more nozzles can be provided) is surrounded by a flow channel 3, here drawn as an annular gap, through which gaseous oxygen 4 is conducted. Diffusion flames 5 will develop starting from nozzles 1. The entire arrangement is surrounded by the walls of the combustion chamber 6. The hot reaction gases are quenched at an appropriate place by means of a quenching device 7.

This invention will be more clearly understood by reference to the following example.

EXAMPLE

Using the process of this invention, quantities of propane, enumerated in column 2 of Table 1, were passed through nozzles 1 of the device depicted in the figures. The quantities of oxygen shown in column 3 of Table 1 were passed through annular gaps 3 surrounding nozzles 1. As a result, momentum ratios enumerated in column 4 were obtained, and the reaction mixtures had the calculated C/O ratios enumerated in column 5 assuming complete mixing. The composition of the quenched gas product of the individual experiments is stated in columns 6–13 of Table 1. In this case the numbers mentioned signify the parts by volume in percent of the individual components of the gas product. Finally, the yields of acetylene and ethylene for each experiment are stated in columns 14 and 15 of Table 1. The yield has been defined as the quotient of the number of moles of carbon in the unsaturated hydrocarbon obtained divided by the number of the moles of carbon in the hydrocarbon used.

TABLE 1

| | | | | | | | Column | | | | | | | |
|---|---|---|---|---|---|---|---|---|---|---|---|---|---|---|
| 1 | 2* | 3* | 4 | 5 | 6 | 7 | 8 | 9 | 10 | 11 | 12 | 13 | 14 | 15 |
| | $V_{KW}$ m.³/h. | $V_{O_2}$ m.³/h. | $I_{KW}/I_{O_2}$ | C/O | $CH_4$ | $C_2H_2$ | $C_2H_4$ | $C_3H_8$ | $H_2$ | CO | $CO_2$ | $H_2O$ | $A_{C_2H_2}$ | $A_{C_2H_4}$ |
| Experiment Number: | | | | | | | | | | | | | | |
| 1 | 2.25 | 2.41 | 2.2 | 1.4 | 7.2 | 5.7 | 5.5 | 0.3 | 40.8 | 27.5 | 3.6 | 9.3 | 0.184 | 0.178 |
| 2 | 2.28 | 2.44 | 18.8 | 1.4 | 5.8 | 6.4 | 4.0 | ........ | 45.3 | 28.4 | 3.0 | 6.7 | 0.225 | 0.103 |
| 4 | 2.36 | 2.31 | 2.7 | 1.53 | 7.4 | 5.6 | 5.8 | ........ | 43.3 | 27.3 | 3.7 | 6.3 | 0.179 | 0.186 |
| 5 | 2.37 | 2.34 | 22.0 | 1.52 | 7.0 | 6.0 | 5.5 | ........ | 44.6 | 27.7 | 3.3 | 5.8 | 0.196 | 0.179 |
| 6 | 2.38 | 2.36 | 63.0 | 1.51 | 6.9 | 7.5 | 1.0 | ........ | 51.8 | 28.4 | 4.2 | 0.5 | 0.265 | 0.032 |
| 7 | 2.44 | 2.23 | 3.0 | 1.64 | 7.9 | 5.6 | 6.4 | 0.5 | 44.7 | 26.9 | 3.7 | 4.7 | 0.175 | 0.200 |
| 8 | 2.50 | 2.27 | 26.0 | 1.65 | 7.5 | 5.7 | 6.3 | ........ | 46.3 | 27.3 | 3.5 | 3.4 | 0.182 | 0.201 |
| 12 | 2.54 | 2.17 | 84.8 | 1.75 | 10.4 | 6.3 | 3.4 | ........ | 48.1 | 27.6 | 4.0 | 0.1 | 0.205 | 0.112 |

*At standard temperature and pressure.
NOTE.—KW=Hydrocarbon; A=Yield.

We claim:
1. An improved process for the production of acetylene-ethylene mixtures by reacting at least one light saturated hydrocarbon with oxygen or an oxygen containing gas in a flame reaction wherein the improvement comprises reacting the hydrocarbon with the oxygen or oxygen containing gas in a diffusion flame having a reaction zone, said hydrocarbon and said oxygen or oxygen containing gas being fed separately to said reaction zone to form a mixture containing the acetylene and ethylene.

2. Process of claim 1 in which the hydrocarbon contains about 1–8 carbon atoms.

3. Process of claim 1 in which the hydrocarbon is propane.

4. A device for preparing acetylene-ethylene mixtures by reacting at least one light saturated hydrocarbon with oxygen or an oxygen containing gas in a diffusion flame, said device comprising walls defining a combustion chamber, at least one nozzle in a wall of the combustion chamber for the passage of the light hydrocarbon, and a flow channel surrounding said nozzle for the passage of oxygen or oxygen containing gas.

5. Use of a diffusion flame as a chemical reactor in the preparation of acetylene-ethylene mixtures comprising reacting at least one light saturated hydrocarbon with oxygen or an oxygen containing gas in a flame reaction using a diffusion flame having a reaction zone, said hydrocarbon and said oxygen or oxygen containing gas being fed separately to said reaction zone.

6. Use of a diffusion flame in accordance with claim 5 wherein the hydrocarbon contains about 1–8 carbon atoms.

7. Use of a diffusion flame in accordance with claim 5 wherein the hydrocarbon is propane.

8. Use of a diffusion flame in accordance with claim 6 wherein the diffusion flame is produced in a combustion chamber having at least one nozzle for the passage of the light hydrocarbon and a flow channel surrounding said nozzle for the passage of oxygen or oxygen containing gas, each of said nozzle and passage discharging gas having a momentum sufficient to produce turbulent flow.

9. Use of a diffusion flame in accordance with claim 8 comprising controlling mixing of the hydrocarbon with the oxygen or oxygen containing gas by the ratio of the momentum of the gas from the nozzle to the momentum of the gas as from the surrounding channel.

10. Use of a diffusion flame in accordance with claim 8 wherein the ratio of the momentum of the gas from the nozzle to the momentum of gas from the surrounding flow channel is about 1–200, and the ratio of carbon atoms to oxygen atoms in the first mixture is about 0.8–1.6.

References Cited
UNITED STATES PATENTS

| | | | |
|---|---|---|---|
| 3,000,989 | 9/1961 | Larcher et al. | 260—679 |
| 3,254,964 | 6/1966 | Lehrer et al. | 260—679 X |
| 3,285,708 | 11/1966 | Loeffler Jr., et al. | 260—679 X |
| 3,415,628 | 12/1968 | Freund et al. | 260—679 X |
| 3,438,741 | 4/1969 | Boyd et al. | 260—679 X |
| 3,460,915 | 8/1969 | Lehrer et al. | 260—679 X |
| 3,542,894 | 11/1970 | Bartholome et al. | 260—679 X |
| 3,551,512 | 12/1970 | Keckler et al. | 260—679 X |
| 3,649,206 | 3/1972 | Ivernel | 260—679 X |

MORRIS O. WOLK, Primary Examiner

R. E. SERWIN, Assistant Examiner

U.S. Cl. X.R.

23—277 R; 48—212; 260—679, 677